(12) United States Patent
Waldorf et al.

(10) Patent No.: US 7,837,247 B2
(45) Date of Patent: Nov. 23, 2010

(54) GRIPPER WITH CENTRAL SUPPORT

(75) Inventors: Conrad Earl Waldorf, Pinckney, MI (US); Anthony Jenkins, Clawson, MI (US); James R. Kalb, Petersburg, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 701 days.

(21) Appl. No.: 11/786,944

(22) Filed: Apr. 13, 2007

(65) Prior Publication Data

US 2008/0018124 A1    Jan. 24, 2008

Related U.S. Application Data

(60) Provisional application No. 60/831,531, filed on Jul. 18, 2006.

(51) Int. Cl.
*B25J 15/00* (2006.01)
(52) U.S. Cl. .......................................... 294/116; 294/88
(58) Field of Classification Search .................. 294/88, 294/106, 115, 116; 269/32, 34
See application file for complete search history.

(56) References Cited

U.S. PATENT DOCUMENTS

| | | | |
|---|---|---|---|
| 0,886,003 A | 4/1908 | Kraft | |
| 3,147,004 A | 9/1964 | Blatt | |
| 3,570,835 A | 3/1971 | McPherson | |
| 5,085,480 A | 2/1992 | Jackson | |
| 5,284,375 A * | 2/1994 | Land, III | 294/88 |
| 5,503,378 A | 4/1996 | Schauss et al. | |
| 5,516,173 A | 5/1996 | Sawdon | |
| 5,647,625 A | 7/1997 | Sawdon | |
| 5,853,211 A * | 12/1998 | Sawdon et al. | 294/116 |
| 6,079,896 A | 6/2000 | Dellach | |
| 6,227,586 B1 * | 5/2001 | Moilanen et al. | 294/88 |
| 6,530,615 B2 * | 3/2003 | Filipiak et al. | 294/88 |
| 6,530,616 B1 * | 3/2003 | McIntosh et al. | 294/106 |
| 6,634,630 B2 * | 10/2003 | Horn et al. | 269/34 |
| 6,641,189 B2 * | 11/2003 | Moilanen et al. | 294/88 |
| 2002/0093211 A1 | 7/2002 | Filipiak et al. | |

FOREIGN PATENT DOCUMENTS

| | | |
|---|---|---|
| DE | 4236670 | 5/1994 |
| EP | 0747172 | 12/1996 |
| WO | 92/12831 | 8/1992 |
| WO | 98/15392 | 4/1998 |

OTHER PUBLICATIONS

International Preliminary Report on Patentability dated Nov. 4, 2008.
International Search Report and Written Opinion dated Dec. 13, 2007.

* cited by examiner

*Primary Examiner*—Dean J Kramer
(74) *Attorney, Agent, or Firm*—Young, Basile, Hanlon & MacFarlane, P.C.

(57) ABSTRACT

A gripper assembly includes at least one gripper jaw and an actuator head linked with the at least one gripper jaw. An actuator selectively operates to move the actuator head between a plurality of positions. A support is fixed relative to the actuator and includes a guide slot that guides the actuator head. One of the actuator head or the guide slot includes a channel and the other of the actuator head or the guide slot includes a guide member extending there from at least partially into the channel.

9 Claims, 6 Drawing Sheets

US 7,837,247 B2

GRIPPER WITH CENTRAL SUPPORT

REFERENCE TO RELATED APPLICATIONS

This application claims priority to U.S. Provisional Application No. 60/831,531, which was filed on Jul. 18, 2006.

BACKGROUND OF THE INVENTION

This invention generally relates to automated handling equipment. More particularly, this invention relates to an actuated gripper device having a central support that guides movement of the actuator and supports at least one gripper jaw.

Automated handling equipment is typically employed in industrial settings for transferring work pieces between work stations. Typically, the equipment includes an actuated gripper that clamps the work pieces while moving them between the stations.

One type of conventional gripper includes an actuator that linearly reciprocates a piston. The piston is coupled to a cam pin that extends outward in opposite directions from the end of the piston. The respective opposing ends of the cam pin are received through cam slots of two opposed gripper jaws, which are received between two sidewalls that extend from the actuator. Each sidewall includes a pivot pin that extends between the sidewalls and through the gripper jaws to pivotally support the jaws from the sidewalls. A cover is usually secured to the outside of each sidewall with multiple fasteners to prevent the pivot pin from sliding out from between the side walls during use. Typically, the sidewalls also include guide slots that guide the ends of the cam pin as the cam pin slides along the cam slots of the jaws to pivot the jaws about the pivot pins between open and closed jaw positions.

The jaws of typical grippers are removable and replaceable with different jaws to accommodate work pieces of varying shapes and sizes. For example, jaws having different cam slot lengths and shapes (i.e., slot angles) may be substituted to change the size of the opening between the jaws. One drawback of conventional grippers is that removing the jaws is rather complex and time consuming. For example, in the conventional gripper described above, the multiple fasteners and the pivot pin must be removed. Each jaw must then be disassembled from the cam pin, which may be tedious because of the confined space between the side walls. Thus, the conventional gripper construction requires assembly and disassembly of a relatively large number of components within a tight space to replace the jaws. Accordingly, there is a need for a gripper construction that provides more convenient jaw replacement.

SUMMARY OF THE INVENTION

An example gripper assembly for providing easy jaw replacement includes at least one gripper jaw and an actuator head linked with the at least one gripper jaw. An actuator selectively moves the actuator head between a plurality of positions to move the gripper jaw. A support is fixed relative to the actuator and includes a guide slot that receives the actuator head. One of the actuator head or the guide slot includes a channel and the other of the actuator head or the guide slot includes a guide member extending there from at least partially into the channel.

In another aspect, the support of an example gripper assembly includes at least one bearing surface that pivotally supports at least one gripper jaw.

DETAILED DESCRIPTION OF THE PREFERRED EMBODIMENT

Figure 1:
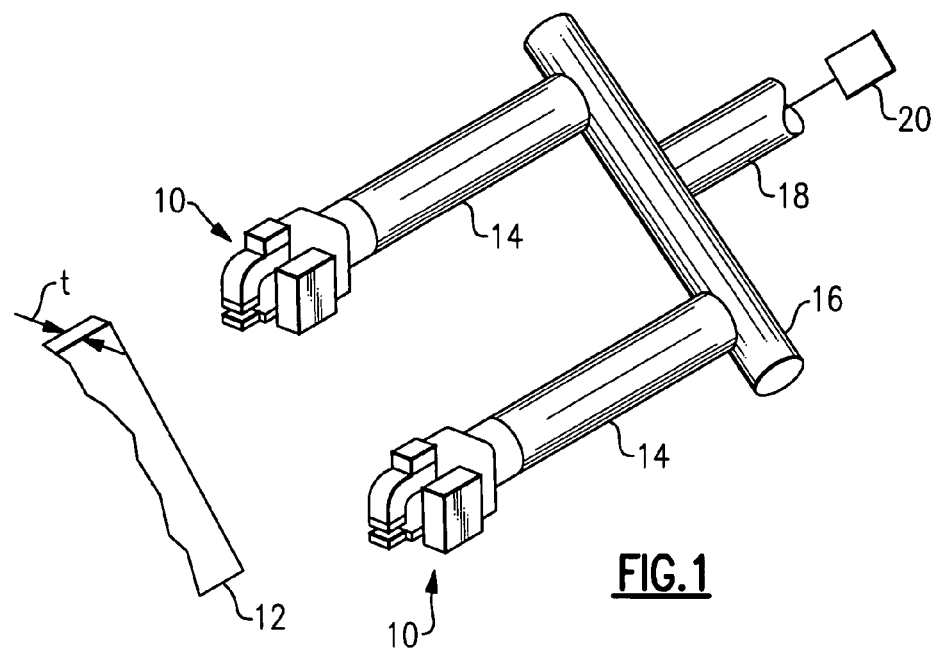
FIG. 1 illustrates example gripper assemblies for moving work pieces between work stations.

FIG. 1 schematically illustrates selected portions of several gripper assemblies 10 used in an example industrial setting to grip and move a work piece 12 (shown schematically). The gripper assemblies 10 may be used in a variety of different configurations from that shown. In this example, the gripper assemblies 10 are coupled to extended arms 14, which are each secured to a rail 16. An adapter arm 18 is secured to the rail 16. An automated machine 20, such as a robot, moves the adapter arm 18, the extended arms 14, and the gripper assemblies 10 to desired positions to retrieve and deposit the work pieces 12, such as between work stations.

Figure 2:
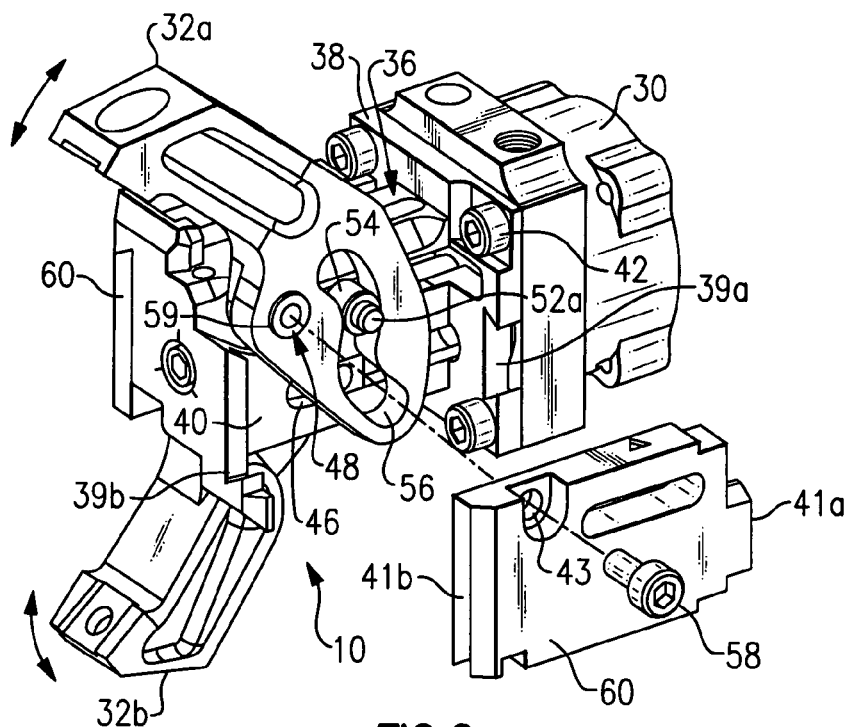
FIG. 2 illustrates a partially exploded view of an example gripper assembly of FIG. 1.
Figure 3:
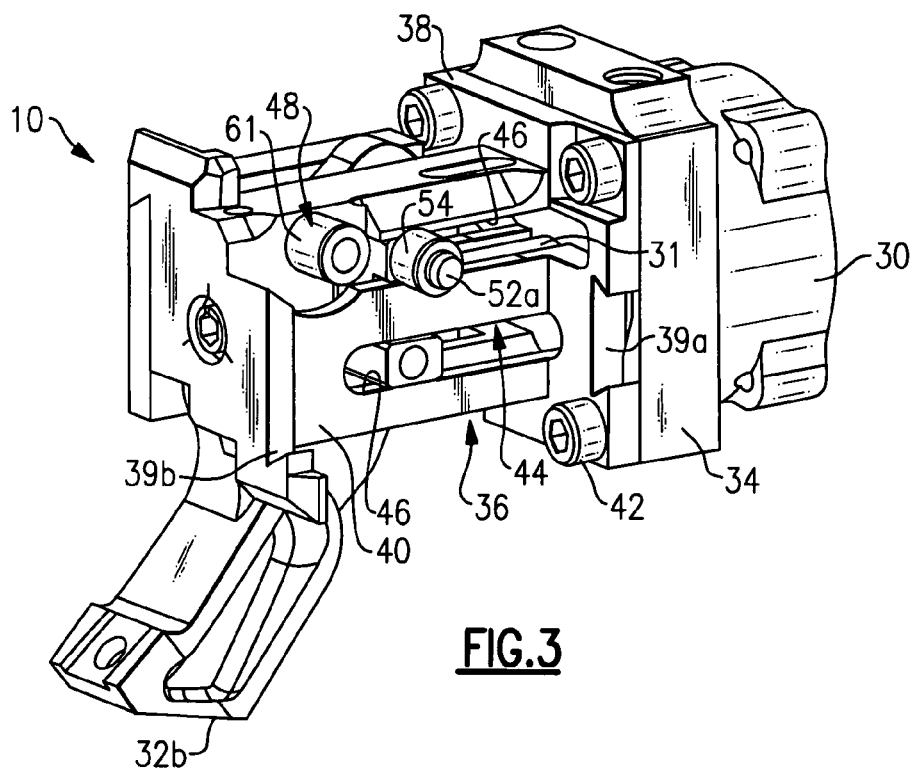
FIG. 3 illustrates a perspective view of selected portions of the example gripper assembly of FIG. 2.
Figure 4:
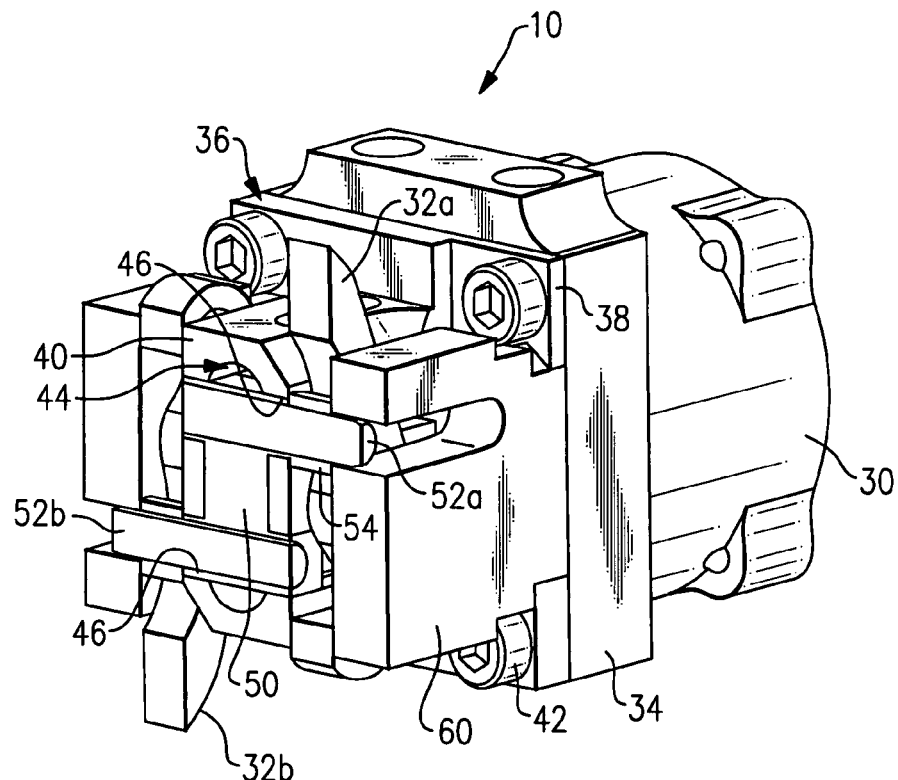
FIG. 4 illustrates a cross-sectional view of selected portions of the example gripper assembly of FIG. 2.
Figure 5:
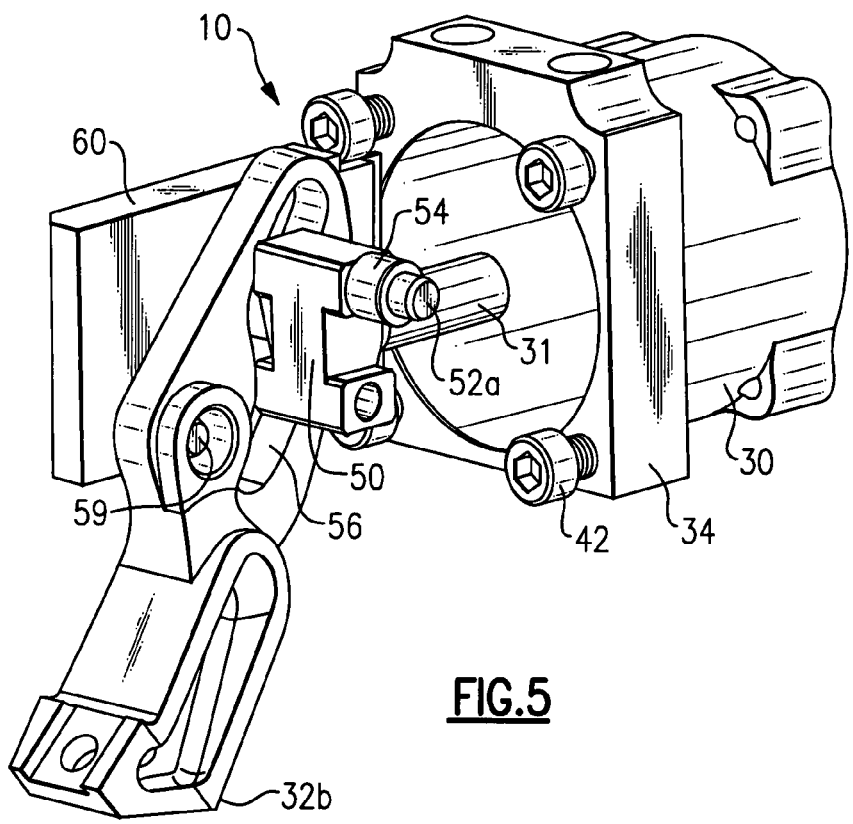
FIG. 5 illustrates a perspective view of selected portions of the example gripper assembly of FIG. 2.

FIGS. 2-5 illustrate various views of selected portions of an example gripper assembly 10. FIG. 2 is a partially exploded view of the gripper assembly 10. FIG. 3 is a partial view of the gripper assembly 10 without one of the jaws. FIG. 4 is a sectioned view, and FIG. 5 is a partial view of the gripper assembly 10 without one of the jaws or a central support. With reference to these figures, the gripper assembly 10 includes an actuator 30, such as a pneumatic or hydraulic actuator, that actuates a piston rod 31 in a known manner to selectively open or close gripper jaws 32a and 32b. For example, the actuator 30 includes a housing 34 that contains a piston within a bore (not shown).

The gripper assembly 10 includes a support 36 having a flange 38 and a support section 40 that extends from the flange 38 generally parallel to the piston rod 31. In this example, four fasteners 42 are received through the flange 38 and into the housing 34 to secure the support 36 and actuator 30 together.

The support 36 includes a hollow central portion 44 (i.e., a guide slot), cam slots 46 that open laterally relative to the length of the hollow central portion 44, and pivot bosses 48 (one shown). The piston rod 31 extends within the hollow central portion 44, which functions as a guide slot for guiding movement of the piston rod 31.

In this example, the support 36, including the pivot bosses 48, is an integral, monolithic piece, which may be formed from a single type of material, for example. The support 36 may be machined from a preformed metal blank, cast, or formed in another known manner to produce the illustrated shape or other desired shape. Given this description, one of ordinary skill in the art will recognize other methods of making the support 36 to suit their particular needs.

A distal end (relative to the actuator 30) of the piston rod 31 is coupled with a cam head 50. Cam pins 52a and 52b are coupled with the cam head 50 and extend outward in opposite lateral directions from the cam head 50. In the disclosed example, two cam pins 52a and 52b are offset from each other such that the cam pins 52a and 52b are non-coaxial. Alternatively, a single cam pin extending in both lateral directions from the cam head 50 or two coaxial cam pins may be used.

Optionally, a roller 54 is received on each of the cam pins 52a and 52b. The cam pins 52a and 52b and rollers 54 are received into cam slots 56 within each of the jaws 32a and 32b. The rollers 54 facilitate movement of the cam pins 52a and 52b through the cam slots 56.

The jaws 32a and 32b are received onto the respective pivot bosses 48. That is, the pivot bosses 48 are received at least partially into respective openings 59 through each of the jaws 32a and 32b. A fastener 58 is received though the opening 59 through each of the jaws 32a and 32b and into the respective pivot bosses 48 to prevent the jaws 32a and 32b from sliding off of the pivot bosses 48.

In the illustrated example, the fasteners 58 are threaded and mate with threads within the pivot bosses 48. The fasteners 58 secure the jaws 32a and 32b to the support 36. In this example, there is some play between the pivot bosses 48 and the openings 59 such that the jaws 32a and 32b can pivot about the respective pivot bosses 48. That is, the pivot bosses 48 provide a bearing surface 61 for rotation of the jaws 32a and 32b.

The fasteners 58 also secure a cover 60 (FIG. 2) over each of the jaws 32a and 32b, which retains the roller 54 within the gripper assembly 10 if the rollers 54 are not secured laterally on the cam pins 52a and 52b. Alternatively, the pivot bosses 48 extend entirely through each of the openings 59, and the fasteners are 58 are c-clips (not shown) that secure to the respective ends of the pivot bosses 48 to pivotally secure the jaws 32a and 32b on the support 36.

In this example, the flange 38 of the support 36 also includes a slot 39a in the shape of a dovetail, for example, that receives a tab 41a on the cover 60. Another slot 39b supports another tab 41b on the cover 60. The tabs 41a and 41b interlock with the slots 39a and 39b to hold the cover on the gripper assembly 10 such that the cover openings 43 align with respective pivot bosses 48 for receiving the fasteners 58.

Figure 6:
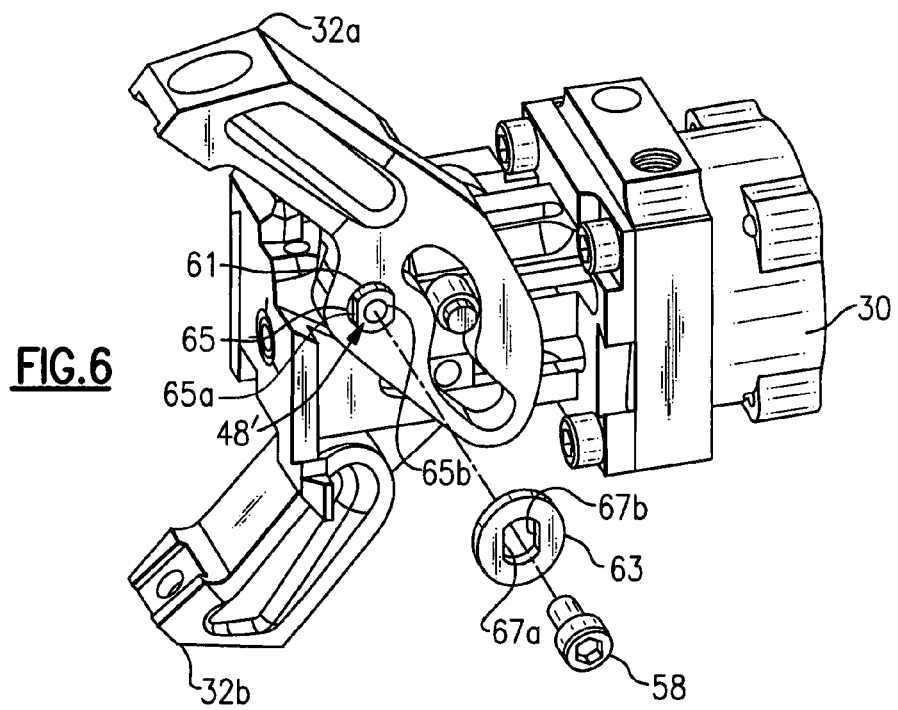
FIG. 6 illustrates another embodiment of a gripper assembly.

In another embodiment shown in FIG. 6, the gripper assembly 10 does not include the covers 60 and instead utilizes keyed washers 63 (one shown) that fit onto respective pivot bosses 48' to hold the jaws 32a and 32b on the gripper assembly 10. Each pivot boss 48' includes flat sides 65a and 65b that correspond to flat sides 67a and 67b of the keyed washer 63. The flat sides 65a, 65b, 67a, 67b prevent the keyed washer 63 from rotating once received onto the pivot boss 48'.

In one example, the covers 60 may not be desired if the rollers 54 are laterally secured to the cam pins 52a and 52b. For example, the rollers 54 and respective cam pins 52a and 52b may include a tongue-and-groove connection that prevents the rollers 54 from sliding laterally on the cam pins 52a and 52b. Other types of connections may also be used to secure the rollers 54 on the cam pins 52a and 52b.

Figure 7:
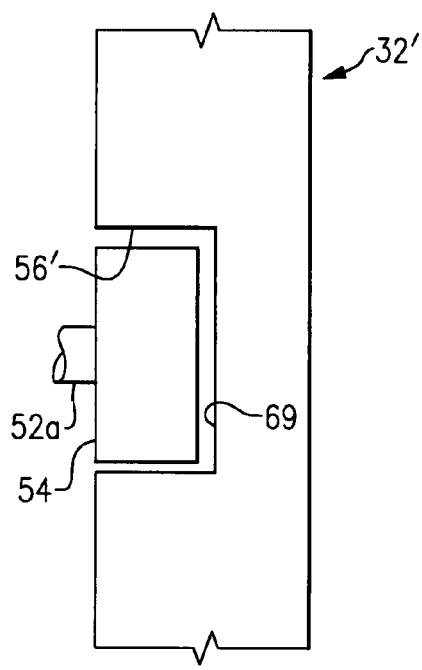
FIG. 7 illustrates a portion of a modified gripper jaw.

In another example, the covers 60 may not be needed to retain the rollers 54 on the respective cam pins 52a, 52b if modified versions of the gripper jaws 32a and 32b are used. FIG. 7 shows one example of a portion of another version of a gripper jaw 32' that is similar to the jaws 32a and 32b. In this example, the gripper jaw 32' includes a cam slot 56' that extends partially through the thickness of the jaw 32', rather than entirely through as cam slot 56 of the jaws 32a and 32b, such that an inner wall 69 retains the roller 54 on the cam pin 52a.

Figure 8:
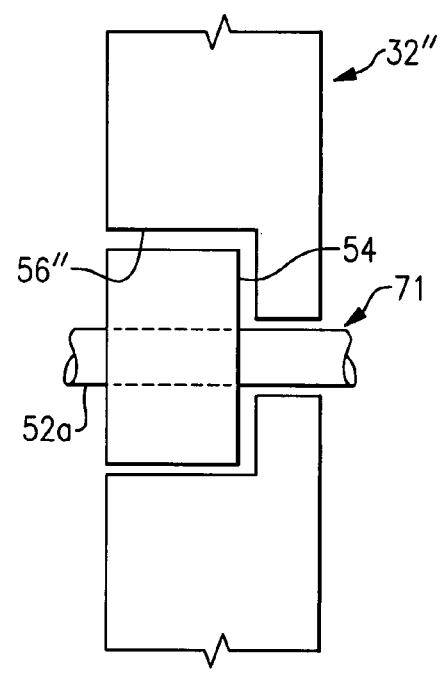
FIG. 8 illustrates a portion of another modified gripper jaw.

FIG. 8 shows another example of a portion of another version of a gripper jaw 32" that is similar to the jaws 32a and 32b. In this example, the jaw 32" includes a stepped cam slot 56" that narrows in a step-wise manner through the thickness of the jaw 32". The stepped shape allows the jaw 32" to retain the roller 54 and allows the end 71 of the cam pin 52a or 52b to extend entirely through the jaw 32" for the purpose of, for example, sensing movement of the jaw 32" via movement of the cam pin 52a or 52b.

In operation, the actuator 30 of the above example gripper assemblies 10 selectively reciprocates the piston rod 31 to move the cam head 50, and hence the cam pins 52a and 52b. The cam slots 46 in the support 36 linearly guide the cam pins 52a and 52b as the cam pins 52a and 52b and respective rollers 54 translate through the cam slots 56 of the jaws 32a and 32b (alternatively slots 56' or 56" of jaws 32' or 32"). The movement of the cam pins 52a and 52b and rollers 54 through the cam slots 56 of the jaws 32a and 32b causes the jaws 32a and 32b to pivot on the bearing surfaces 61 about the respective pivot bosses 48 between open and closed positions.

In the disclosed example, the construction of the gripper assembly 10 provides convenient replacement of the jaws 32a and 32b with different jaws. To remove the jaws 32a and 32b, the fasteners 58 are removed. This allows the jaws 32a and 32b to slide off of the cam pins 52a and 52b and rollers 54, and replacement jaws can then be slid onto the cam pins 52a and 52b and rollers 54. If covers 60 are used, removal of the fasteners 58 also allows the covers 60 to slide out from the slots 39a and 39b to access the jaws 32a and 32b.

It is the construction of the gripper assembly 10 that provides such easy replacement of the jaws 32a and 32b. In the disclosed example, the jaws 32a and 32b are supported by the pivot bosses 48 on the outside of the support 36 rather than between sidewall supports as in previously known gripper assemblies. Thus, the pivot bosses 48 provide a dual function of allowing the jaws 32a and 32b to pivot and securing the jaws 32a and 32b to the support 36. This allows the jaws 32a and 32b to be removed with the removal of fewer components than previous gripper assemblies and provides direct access to the jaws 32a and 32b rather than trapping the jaws between sidewalls as in previous gripper assemblies.

Figure 9:
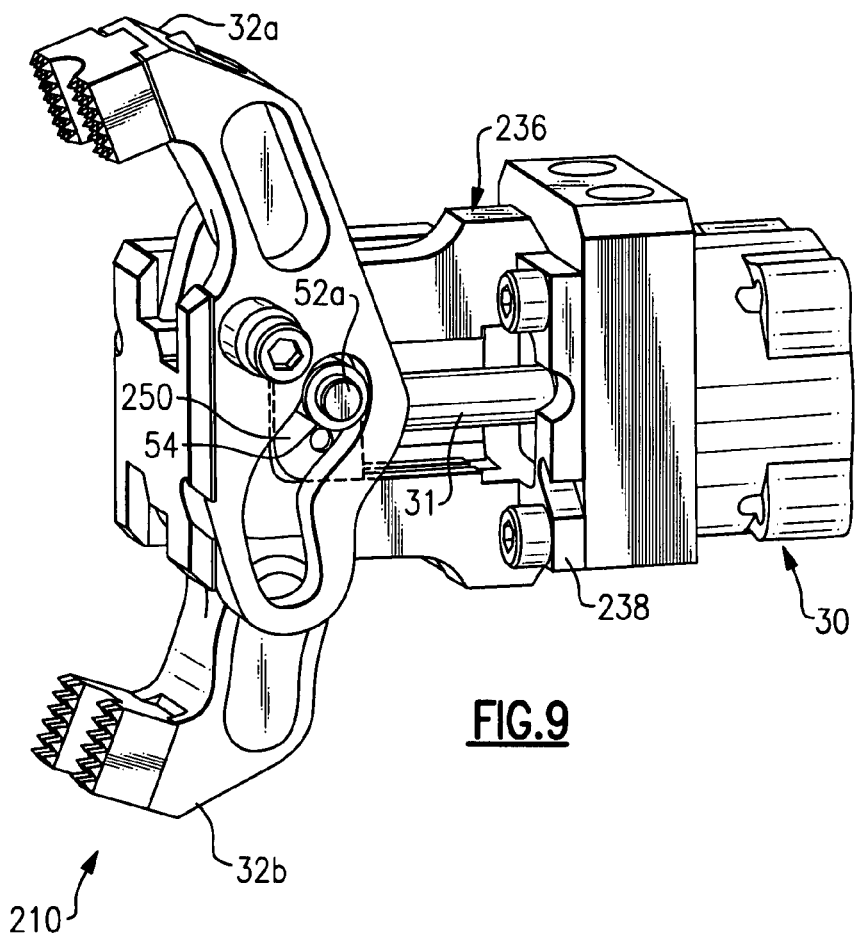
FIG. 9 illustrates another example gripper assembly.
Figure 10:
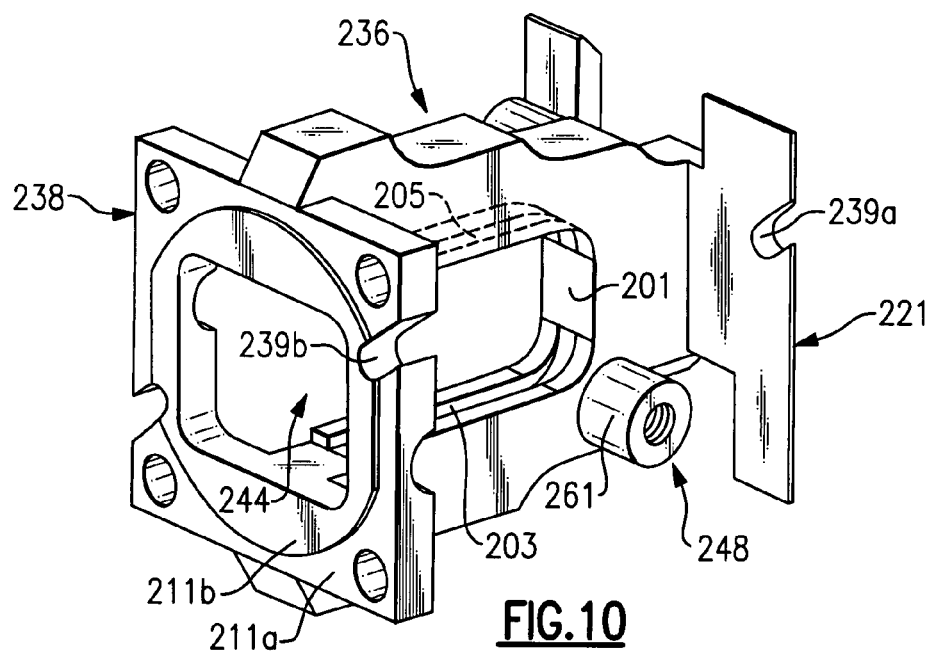
FIG. 10 illustrates an isolated view of a support of the gripper assembly of FIG. 9.

FIG. 9 illustrates another embodiment of a gripper assembly 210 that is similar to the gripper assembly 10 except that the gripper assembly 210 includes modified versions of a support 236 and a cam head 250. In this example, components that are substantially similar to the embodiments shown in FIGS. 2-5 are represented with like numerals. FIG. 10 illustrates an isolated view of the support 236. In this example, the support 236 includes a hollow central portion 244 that is laterally open, but does not include the cam slots 46 of the previous example gripper assembly 10.

The hollow central portion 244 extends from a mounting flange 238 to a curved end 201. The hollow central portion 244 includes guide channels 203 and 205 that extend at least part of the distance between the mounting flange 238 and curved end 201. In this example, the guide channels 203 and 205 are of a non-uniform depth such that the ends of the guide channels 203 and 205 gradually become shallower in depth near the curved end 201. It is to be understood that other example supports may include only a single guide channel, and the channel or channels may also be of uniform depth.

The support 236 also includes pivot bosses 248 having outer bearing surfaces 261 for pivotally supporting jaws 32a and 32b. In this example, the pivot bosses 248 and the support 236 form an integral, monolithic piece. For example, the support 236 may be machined from a pre-formed metal blank, cast, or formed in another known manner to produce the illustrated shape or other desired shape.

The mounting flange 238 includes a first surface 211a and a second surface 211b that is raised relative to the first surface 211a. The raised second surface 211b functions as a locator to mount the support 236 in a desired orientation onto a corresponding recessed portion of the actuator 30.

The support 236 also includes a head 221 (i.e., a collision surface) that may act to stop work pieces inserted between the jaws 32a and 32b, for example. In this example, the head 221 spans across a distance 223 (FIG. 11) that is greater than a width 225 of the hollow central portion 244. That is, the head 221 is larger than at least the central portion of the support 236.

Figure 11:
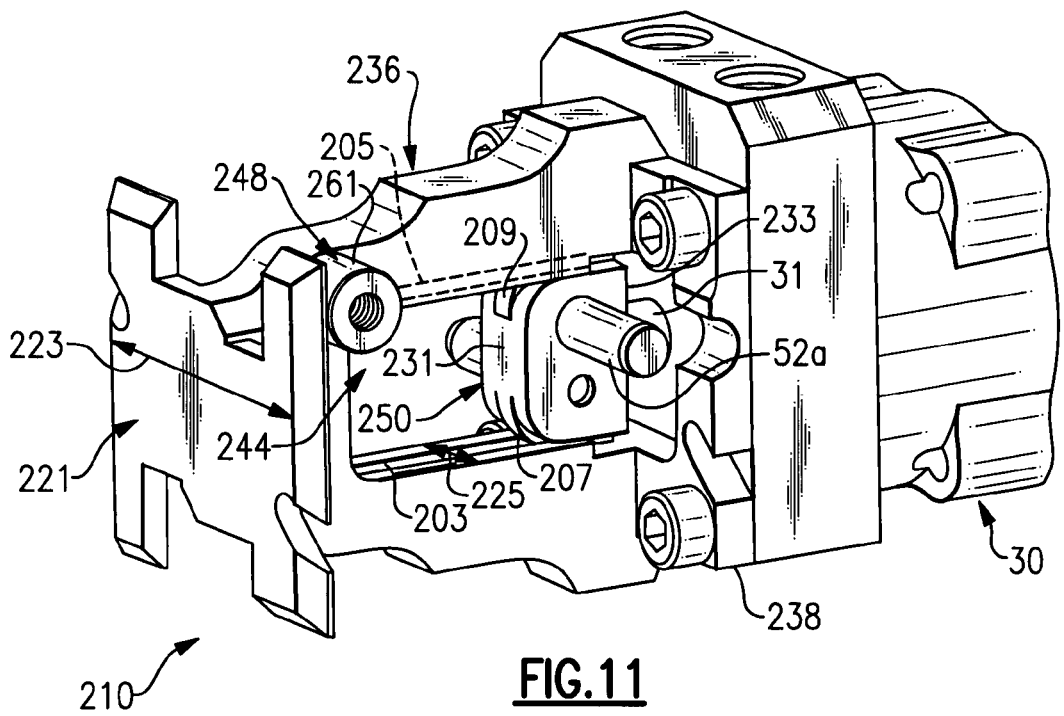
FIG. 11 illustrates a partial view of the gripper assembly of FIG. 9 without the gripper jaws.
Figure 12:
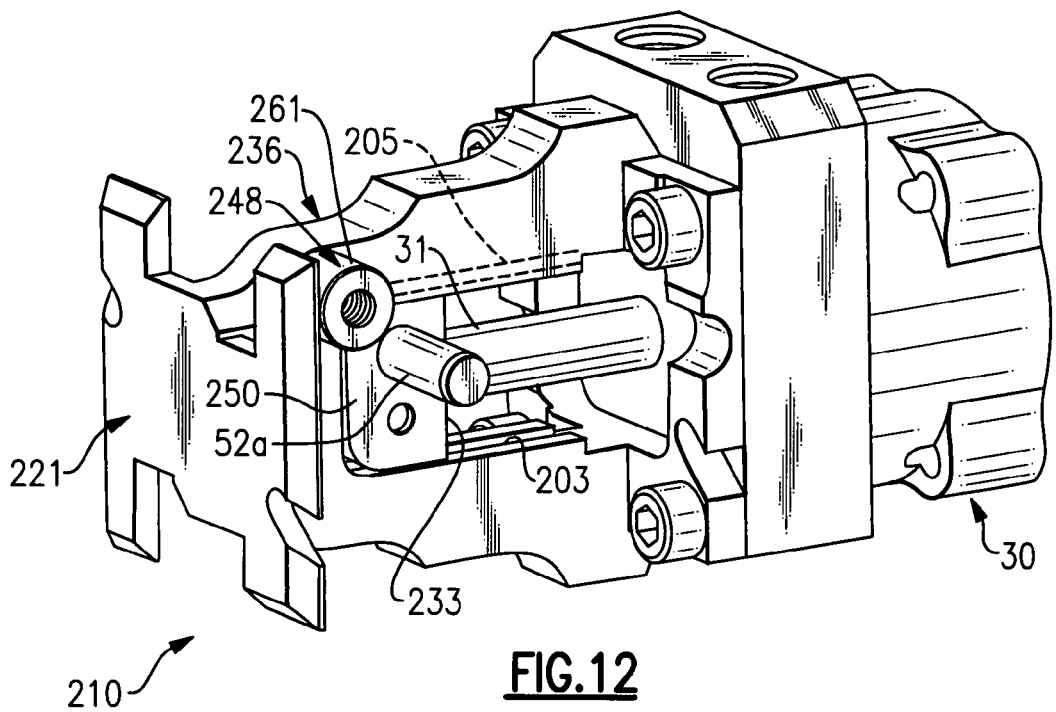
FIG. 12 illustrates another partial view of the gripper assembly of FIG. 9 without the gripper jaws.

Referring to FIG. 11 (cam head 250 retracted) and FIG. 12 (cam head 250 extended), the guide channels 203 and 205 receive corresponding guide members 207 and 209 formed on the cam head 250. Alternatively, the guide channels 203 and 205 may be located on the cam head 250 and the guide members 207 and 209 may be located on the support 236. The guide members 207 and 209 interlock with the guide channels 203 and 205 to linearly guide the cam head 250 as the piston rod 31 reciprocates. That is, the guide channels 203 and 205 and the guide members 207 and 209 limit lateral movement of the cam head 250 during reciprocation.

The cam head 250 includes a curved surface 231 that faces in a direction generally outward from the actuator 30 and an opposing surface 233 facing into a direction generally toward the actuator 30. In the illustrated example, the curved surface 231 has a curvature that corresponds to a curvature of the curved end 201 of the support 236. The combination of the curved surface 231 and the curved end 201 with the gradually shallowing guide channels 203 and 205 reduces the length of the gripper assembly 210, which would otherwise be longer if squared ends were used.

Figure 13:
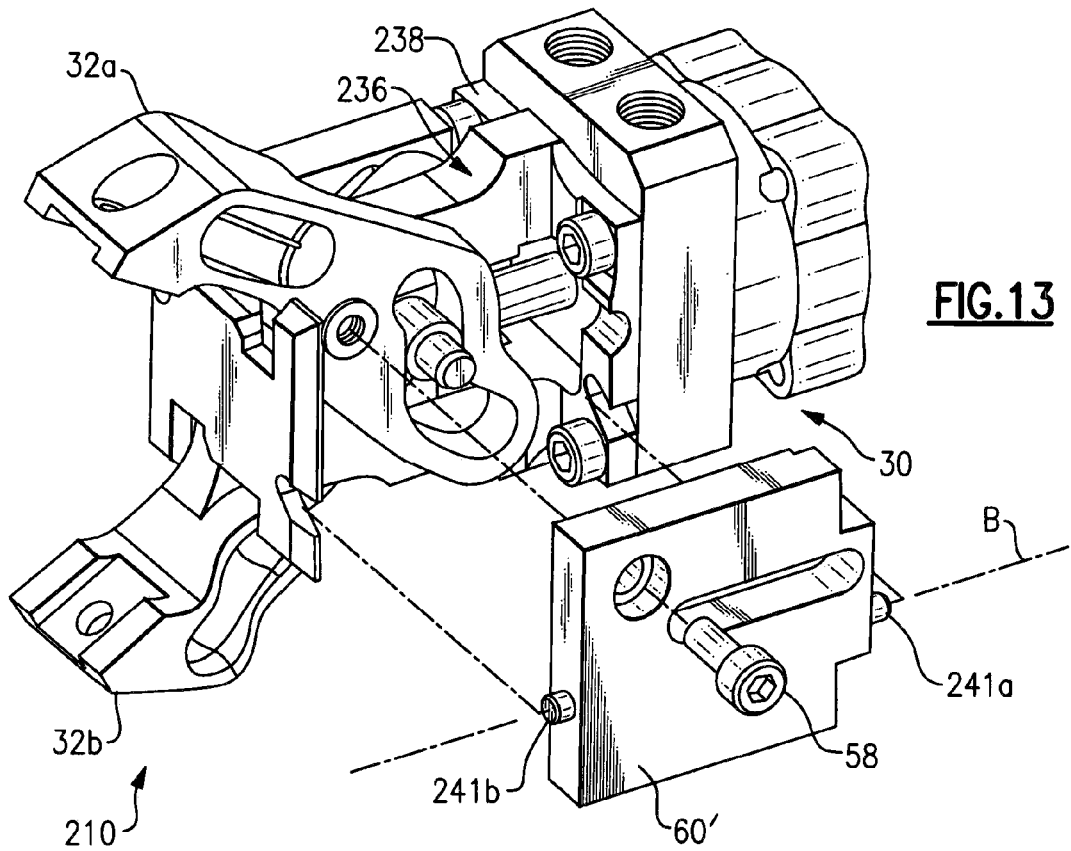
FIG. 13 illustrates the gripper assembly of FIG. 9 with an optional cover.

Optionally, as shown in FIG. 13, the gripper assembly 210 also includes a cover 60', similar to the cover 60 in the previous examples except that the cover 60' includes pivot tabs 241a and 241b that are slidably received into corresponding slots 239a and 239b of the support 236. The pivot tabs 241a and 241b allow pivoting of the covers 60' about an axis B when the fasteners 58 are removed to provide access to the jaws 32a and 32b. That is, by pivoting one of the covers 60' outward from the gripper assembly 210, the jaw 32a is free to slide off of the pivot boss 248 for replacement. Likewise, the other jaw 32b can be removed and replaced by pivoting the other cover 60'.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gripper assembly, comprising:
   at least one gripper jaw having a cam slot formed therein;
   an actuator head;
   a cam pin connected to the actuator head and disposed in the cam slot of the at least one gripper jaw;
   an actuator operative for moving the actuator head to move the at least one gripper law by engagement of the cam pin with the cam slot of the at least one gripper jaw;
   a support that is fixed relative to the actuator, the support including a guide slot that receives the actuator head, where one of the actuator head or the guide slot includes a channel, and the other of the actuator head or the guide slot includes a guide member extending there from at least partially into the channel; and
   wherein the one of the actuator head or the guide slot that includes the channel further includes another channel, and the other of the actuator head or the guide slot further includes another guide member extending there from at least partially into the other channel.

2. The gripper assembly as recited in claim 1, wherein the channels open in opposite directions.

3. The gripper assembly as recited in claim 1, wherein the guide members extend in opposite directions.

4. The gripper assembly as recited in claim 1, wherein the support includes a first end near the actuator and a second end distal from the actuator, the first end including a mount section having a first planar surface and a second planar surface raised relative to the first planar surface for locating the support on the actuator.

5. A gripper assembly, comprising:
   at least one gripper jaw;
   an actuator head linked with the at least one gripper jaw;
   an actuator operative for moving the actuator head to move the at least one gripper jaw; and
   a support that is fixed relative to the actuator, the support including a guide slot that receives the actuator head, where one of the actuator head or the guide slot includes a channel and the other of the actuator head or the guide slot includes a guide member extending there from at least partially into the channel, wherein the guide member protrudes from a surface of the actuator head or the guide slot, where a nominal height that the guide member protrudes gradually increases along the surface.

6. A gripper assembly, comprising:
   at least one gripper jaw having a cam slot and a substantially cylindrical pivot opening formed therein;
   an actuator head;
   a cam in connected to the actuator head and disposed in the cam slot of the at least one gripper jaw;
   an actuator operative for moving the actuator head to move the at least one gripper jaw by engagement of the cam pin with the cam slot of the at least one gripper jaw;
   a support that is fixed relative to the actuator, the support including a guide slot that receives the actuator head and at least cylindrical protrusion that extends integrally outward from the support and is disposed in the pivot opening of the at least one gripper jaw to pivotally support the at least gripper jaw; and wherein the at least one gripper jaw includes a first jaw and a second jaw, and the at least one cylindrical protrusion comprises a first cylindrical protrusion pivotally supporting the first jaw and a second cylindrical protrusion pivotally supporting the second jaw, wherein the guide slot of the support is located between the first jaw and the second jaw.

7. The gripper assembly as recited in claim 6, wherein one of the actuator head or the guide slot includes a channel and the other of the actuator head or the guide slot includes a guide member extending there from at least partially into the channel.

8. The gripper assembly as recited in claim 6, further comprising at least one removable cover secured to the support, wherein the at least one gripper jaw is disposed between the support and removable cover.

9. The gripper assembly as recited in claim 8, wherein one of the at least one removable cover or the support includes at least one tab extending there from and the other of the at least one tab or the support includes at least one slot for receiving the tab to secure the cover and the support together.

\* \* \* \* \*